US011986839B2

(12) United States Patent
Ihara et al.

(10) Patent No.: US 11,986,839 B2
(45) Date of Patent: May 21, 2024

(54) ELECTROSTATIC SEPARATOR

(71) Applicant: KAWASAKI JUKOGYO KABUSHIKI KAISHA, Kobe (JP)

(72) Inventors: Takayuki Ihara, Kobe (JP); Koki Ikeda, Kobe (JP); Naoya Ogiyama, Kobe (JP); Yusuke Iida, Kobe (JP); Manabu Masamoto, Kobe (JP); Koji Fukumoto, Kobe (JP); Gen Kiyotaki, Kobe (JP); Keiichi Mashio, Kobe (JP); Tomoyuki Suzuki, Kobe (JP); Ryoma Yamamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/033,488

(22) PCT Filed: Oct. 23, 2020

(86) PCT No.: PCT/JP2020/039914
§ 371 (c)(1),
(2) Date: Apr. 24, 2023

(87) PCT Pub. No.: WO2022/085181
PCT Pub. Date: Apr. 28, 2022

(65) Prior Publication Data

US 2023/0405604 A1 Dec. 21, 2023

(51) Int. Cl.
*B03C 7/04* (2006.01)
*B03C 3/08* (2006.01)
*B03C 3/09* (2006.01)

(52) U.S. Cl.
CPC .................. *B03C 7/04* (2013.01); *B03C 3/08* (2013.01); *B03C 3/09* (2013.01)

(58) Field of Classification Search
None
See application file for complete search history.

(56) References Cited

U.S. PATENT DOCUMENTS 2,847,124 A * 8/1958 Brastad .................... B03C 7/04 209/127.1
3,402,814 A * 9/1968 Marius ...................... B03C 7/04 209/127.1

(Continued)

FOREIGN PATENT DOCUMENTS

JP 2006-043684 A 2/2006
JP 3981014 B2 9/2007

(Continued)

*Primary Examiner* — Joseph C Rodriguez
(74) *Attorney, Agent, or Firm* — Oliff PLC

(57) ABSTRACT

An electrostatic separator separates conductive particles from raw materials includes: a container with a raw material layer; a gas dispersion plate at the bottom of the raw material layer; at least one vibrating body in the raw material layer flush with the gas dispersion plate or above it; a fluidization gas supplier introduced from the container bottom into the raw material layer flows upward through the gas dispersion plate; an upper electrode above the raw material layer; a lower electrode in the raw material layer, the lower electrode being flush with the gas dispersion plate or above it; a power supply applies a voltage between the upper and lower electrode wherein one becomes a negative electrode, the other becomes a positive electrode, and an electric field is generated between them; and a capturer captures conductive particles that have flown out of the raw material layer surface toward the upper electrode.

10 Claims, 6 Drawing Sheets

(56) References Cited

U.S. PATENT DOCUMENTS

| | | | | | |
|---|---|---|---|---|---|
| 3,407,930 | A * | 10/1968 | Marius | B03C 7/04<br>209/11 |
| 3,489,279 | A * | 1/1970 | St John | B03C 7/02<br>209/243 |
| 3,496,413 | A * | 2/1970 | Adams | B05C 19/025<br>118/DIG. 5 |
| 3,892,044 | A * | 7/1975 | Kayatz | F27D 15/0213<br>209/44 |
| 7,119,298 | B2 * | 10/2006 | Yoshiyama | B03C 7/04<br>209/132 |
| 2004/0035758 | A1 | 2/2004 | Yoshiyama et al. | |
| 2009/0065402 | A1 * | 3/2009 | Takikawa | B03C 3/09<br>209/127.1 |
| 2019/0346357 | A1 * | 11/2019 | Mizuno | B03C 3/017 |

FOREIGN PATENT DOCUMENTS

| | | | |
|---|---|---|---|
| JP | 2015-160190 | A | 9/2015 |
| JP | 2017-023894 | A | 2/2017 |
| WO | 2002/076620 | A1 | 10/2002 |

* cited by examiner

ELECTROSTATIC SEPARATOR

CROSS-REFERENCE TO RELATED APPLICATIONS

This is a National Phase of International Application No. PCT/JP2020/039914 filed Oct. 23, 2020. The disclosure of the prior application is hereby incorporated by reference herein in its entirety.

TECHNICAL FIELD

The present disclosure relates to an electrostatic separator that separates conductive particles from raw materials including the conductive particles and insulating particles.

BACKGROUND ART

Electrostatic separators that separate conductive particles by electrostatic force from raw materials including the conductive particles and insulating particles (nonconductive particles) have been known. Such electrostatic separators may be utilized to separate specific components from coal ash or waste (such as waste plastic, garbage, or incineration ash), remove impurities of food, concentrate minerals, and the like. PTL 1 discloses this type of electrostatic separator.

The electrostatic separator disclosed in PTL 1 includes: a flat plate-shaped bottom electrode; and a flat plate-shaped mesh electrode located above the bottom electrode and including a large number of opening portions. A voltage is applied between these electrodes, and this generates a separation zone between these electrodes by electrostatic force. Moreover, the bottom electrode is constituted by a gas dispersion plate having gas permeability, and a dispersion gas is introduced to the separation zone from a lower side of the gas dispersion plate. Vibration is applied to at least one of the bottom electrode or the mesh electrode. With this, the conductive particles in the raw materials supplied to the separation zone pass through the opening portions of the mesh electrode to be separated above the separation zone. The conductive particles separated above the separation zone are conveyed by gas flow to a dust collector through a suction pipe and are collected by the dust collector.

CITATION LIST

Patent Literature

PTL 1: Japanese Patent No. 3981014

SUMMARY OF INVENTION

Technical Problem

According to the electrostatic separator of PTL 1, a thin layer of the raw materials is merely formed on the bottom electrode. Moreover, since a container on which the bottom electrode is mounted is vibrated, increasing the size of the electrostatic separator is difficult. For such reasons, processing a large amount of raw materials at once is difficult, and there is still room for improvement in processing capacity.

The present disclosure was made under these circumstances, and an object of the present disclosure is to provide a structure that can improve processing capacity of an electrostatic separator that separates conductive particles by electrostatic force from raw materials including the conductive particles and insulating particles.

Solution to Problem

An electrostatic separator according to one aspect of the present disclosure is an electrostatic separator that separates conductive particles from raw materials including the conductive particles and insulating particles. The electrostatic separator includes: a container in which a raw material layer including the raw materials is located; a gas dispersion plate located at a bottom portion of the raw material layer; at least one vibrating body located in the raw material layer, the at least one vibrating body being flush with the gas dispersion plate or being located above the gas dispersion plate; a fluidization gas supplier that supplies a fluidization gas that is introduced from a bottom portion of the container into the raw material layer and flows upward in the raw material layer through the gas dispersion plate; an upper electrode located above the raw material layer; a lower electrode located in the raw material layer, the lower electrode being flush with the gas dispersion plate or being located above the gas dispersion plate; a power supply that applies a voltage between the upper electrode and the lower electrode such that one of the upper electrode and the lower electrode becomes a negative electrode, the other becomes a positive electrode, and an electric field is generated between these electrodes; and a capturer that captures the conductive particles that have flown out of a surface of the raw material layer toward the upper electrode.

The particle diameter of the raw material included in the raw material layer is smaller than the particle diameter of a flowing medium (for example, sand) of a general fluidized bed. Therefore, blow-by of the fluidization gas tends to occur, and the raw material layer is not satisfactorily fluidized by the occurrence of the blow-by. However, since the vibrating body is located in the raw material layer as above, the occurrence of the blow-by in the raw material layer is suppressed, and therefore, a satisfactory fluidized state of the raw material layer is maintained. With this, the contact between the electrode and the raw materials in the raw material layer is promoted, and the processing capacity of the electrostatic separator is improved.

Advantageous Effects of Invention

The present disclosure can provide a structure that can improve processing capacity of an electrostatic separator that separates conductive particles by electrostatic force from raw materials including the conductive particles and insulating particles.

DESCRIPTION OF EMBODIMENTS

Figure 1:
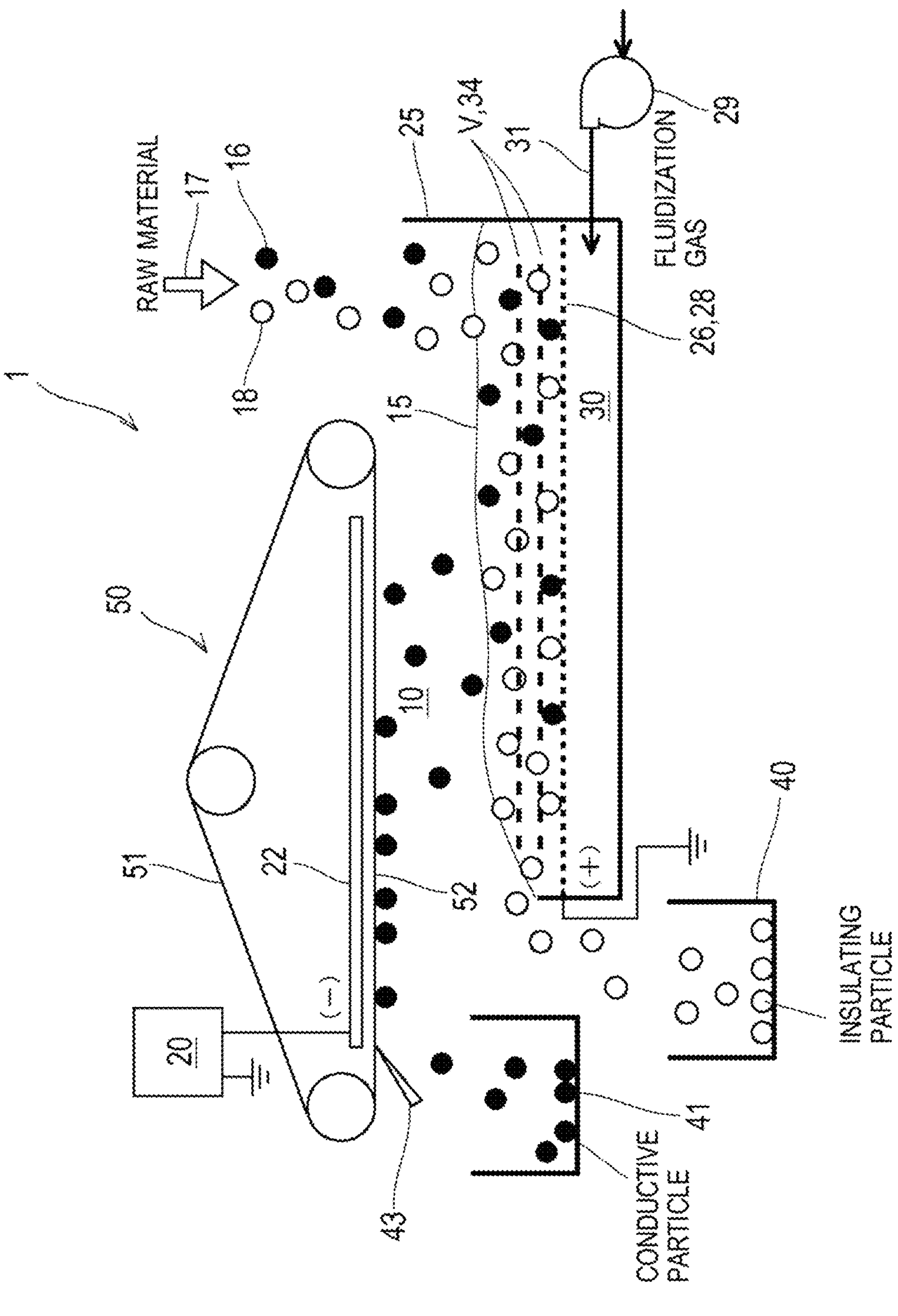
FIG. 1 is a diagram showing an entire configuration of an electrostatic separator according to an embodiment of the present disclosure.

Next, an electrostatic separator 1 according to an embodiment of the present disclosure will be described with reference to FIG. 1. FIG. 1 is a diagram showing an entire configuration of the electrostatic separator 1 according to the embodiment of the present disclosure. The electrostatic separator 1 according to the present embodiment mainly separates conductive particles 16 from raw materials 17 including the conductive particles 16 and insulating particles 18. For example, the electrostatic separator 1 may be used to separate unburned carbon (conductive particles 16) from coal ash (raw materials 17) including the unburned carbon (conductive particles 16) and ash (insulating particles 18). However, the use of the electrostatic separator 1 is not limited to this. The electrostatic separator 1 may be used to separate various particles or powder. The electrostatic separator 1 may be used to separate materials that are different in electrical conductivity or charging property from each other, for example, separate metal from waste, remove impurities from mercury, mineral, or food, etc.

Configuration of Electrostatic Separator 1

As shown in FIG. 1, the electrostatic separator 1 according to the present embodiment includes: a container 25 including a raw material layer 15; a gas dispersion plate 26 located at a bottom portion of the raw material layer 15; at least one vibrating body V located in the raw material layer 15, the at least one vibrating body V being flush with the gas dispersion plate 26 (or being located above the gas dispersion plate 26); a fluidization gas supplier 29 that supplies a fluidization gas 31 that flows upward in the raw material layer 15 through the gas dispersion plate 26; an upper electrode 22 located above the raw material layer 15; a lower electrode 28 located in the raw material layer 15, the lower electrode 28 being flush with the gas dispersion plate 26 (or being located above the gas dispersion plate 26); a capturer 50; and a power supply 20.

A conveyor capturer is adopted as the capturer 50. The capturer 50 includes an endless conveyor belt 51 and a rotary driver (not shown) for the conveyor belt 51. The conveyor belt 51 includes a nonconductor.

The upper electrode 22 is located inside a loop of the conveyor belt 51. An outside surface of the loop of the conveyor belt 51 is a conveyance surface 52. A "capture region 10" is defined as a region located above the raw material layer 15 and under the upper electrode 22. The conveyor belt 51 that is rotating passes through the capture region 10 in such a posture that the conveyance surface 52 faces downward. The conveyance surface 52 of the conveyor belt 51 passing through the capture region 10 may be substantially horizontal.

The capturer 50 includes a particle separation structure 43. A conductive particle collecting container 41 is located under the particle separation structure 43. The particle separation structure 43 is, for example, a spatula-shaped structure (scraper) and can scrape the particles adhering to the conveyor belt 51. However, the particle separation structure 43 may be a structure (for example, an anti-static brush) having a destaticizing function and may destaticize the particles adhering to the conveyor belt 51 to separate the particles from the conveyor belt 51.

Figure 2:
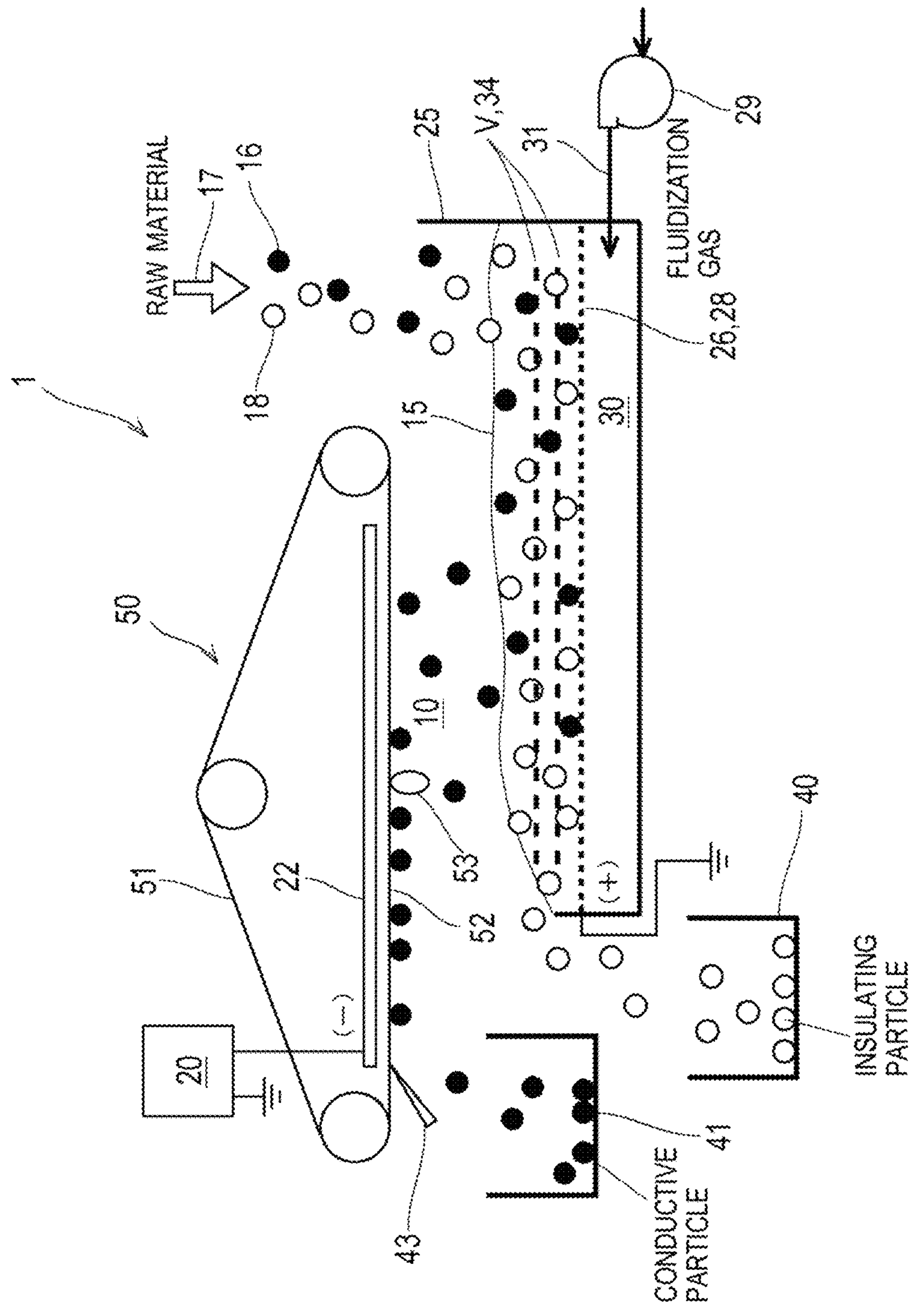
FIG. 2 is a diagram for explaining a modified example of the electrostatic separator including a capturer at which an insulating particle separation promoter is located.

FIG. 2 shows a modified example of the electrostatic separator 1 including the capturer 50 at which an insulating particle separation promoter 53 is located. As shown in FIG. 2, the capturer 50 may further include the insulating particle separation promoter 53 that separates the insulating particles 18, adhering to the conveyor belt 51 or the conductive particles 16 by intermolecular force, from the conveyor belt 51. With this, the insulating particles 18 adhering by the intermolecular force are separated from the conveyor belt 51, and the concentration of the conductive particles 16 collected in the conductive particle collecting container 41 can be increased.

The insulating particle separation promoter 53 is, for example, a shaker that shakes the conveyance surface 52 by contacting the downward-facing conveyance surface 52 of the conveyor belt 51 and applying rotational vibration generated by the rotation of a motor. However, the insulating particle separation promoter 53 may be a shaker located above the conveyance surface 52 (i.e., inside the loop of the conveyor belt 51) so as to contact a surface of the conveyor belt 51 which is opposite to the conveyance surface 52. Moreover, the insulating particle separation promoter 53 may apply vibration to the conveyor belt 51 by intermittently spraying compressed air. Furthermore, the conveyor belt 51 may be made of a material through which the conductive particles 16 and the insulating particles 18 cannot pass but gas can pass, and the insulating particle separation promoter 53 may supply a small amount of gas in a direction from the inside of the conveyor belt 51 toward the capture region 10 to separate the insulating particles 18 adhering to the conveyance surface 52 or the conductive particles 16.

Referring back to FIG. 1, the gas dispersion plate 26 including a large number of minute holes is located at a bottom portion of the container 25. The gas dispersion plate 26 may be a porous plate or a porous sheet. The raw materials 17 including the conductive particles 16 and the insulating particles 18 are supplied to the container 25 by a supplier (not shown). The raw material layer 15 is formed by the raw materials 17 accumulated in the container 25.

When the raw materials 17 are continuously or intermittently supplied to a first side of the container 25, the raw materials 17 gradually move from the first side of the container 25 toward a second side opposite to the first side. An insulating particle collecting container 40 that collects the particles (mainly the insulating particles 18) that have overflowed from the container 25 is located at the second side of the container 25.

Figure 3:
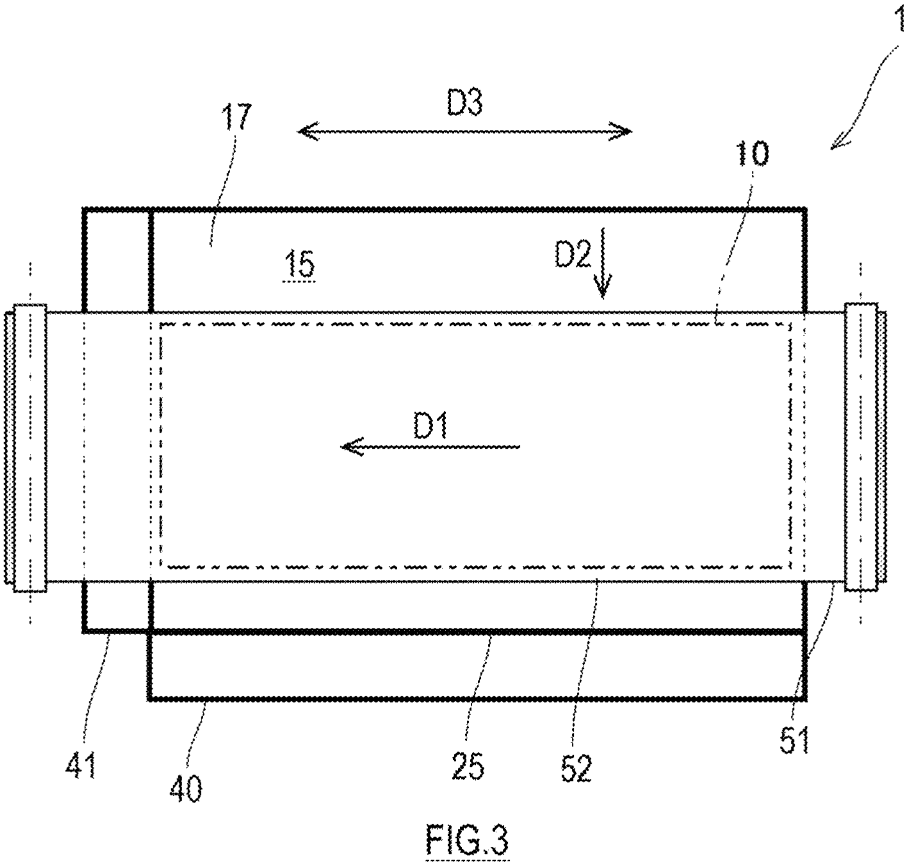
FIG. 3 is a plan view showing a relation between a movement direction of a conveyance surface of a conveyor belt and a flow direction of raw materials.

FIG. 3 is a plan view showing a relation between a movement direction D1 of the conveyance surface 52 of the conveyor belt 51 and a flow direction D2 of the raw materials 17. As shown in FIG. 3, the movement direction D1 of the conveyance surface 52 of the conveyor belt 51 passing through the capture region 10, i.e., the movement direction of the conductive particles 16 adhering to the conveyance surface 52 and the flow direction D2 of the raw materials 17 in the container 25 (raw material layer 15) are substantially orthogonal to each other in a plan view. To process a larger amount of raw materials 17 at once, it is desirable to increase a dimension of the container 25 in a width direction D3 orthogonal to the flow direction D2. In FIG. 1, the movement direction D1 and the flow direction D2 are parallel to each other. However, the relation between the movement direction D1 and the flow direction D2 is not limited to those shown in the drawings.

As described above, the raw materials 17 in the container 25 gradually move in the flow direction D2 from the first side of the container 25 toward the second side. When the raw materials 17 in the container 25 approach the capture region 10, the conductive particles 16 are charged and adhere to the conveyance surface 52 of the conveyor belt 51. Therefore, the amount of conductive particles 16 to be charged gradually decreases from an upstream side to a downstream side in the flow direction D2. The conductive particles 16 adhering to the conveyance surface 52 of the conveyor belt 51 occupy the conveyance surface 52 until the conductive particles 16 are removed by the particle separation structure 43. Therefore, further adhering of the conductive particles 16 is inhibited. On this account, when the movement direction D1 and the flow direction D2 are orthogonal to each other, the conductive particles 16 adhere to and are collected by the conveyance surface 52 more efficiently than when the movement direction D1 and the flow direction D2 are parallel to each other. If the movement direction D1 of the conveyance surface 52 of the conveyor belt 51 passing through the capture region 10 and the flow direction D2 are parallel to each other, the width of the conveyor belt 51 increases. As above, to suppress the width of the conveyor belt 51, it is desirable that the movement direction D1 and the flow direction D2 be orthogonal to each other in a plan view. However, the movement direction D1 and the flow direction D2 may be parallel to each other.

Referring back to FIG. 1, a wind box 30 is located under the container 25. The fluidization gas 31 is supplied from the fluidization gas supplier 29 to the wind box 30. The fluidization gas 31 may be, for example, air. It is desirable that the fluidization gas 31 be a dehumidified gas (for example, a dehumidified gas having a dew point of 0° C. or lower). The fluidization gas 31 is introduced from the wind box 30 through the bottom portion of the container 25 into the raw material layer 15 and flows upward in the raw material layer 15 while flowing through the gas dispersion plate 26, the lower electrode 28, and an intermediate electrode 34.

Figure 4:
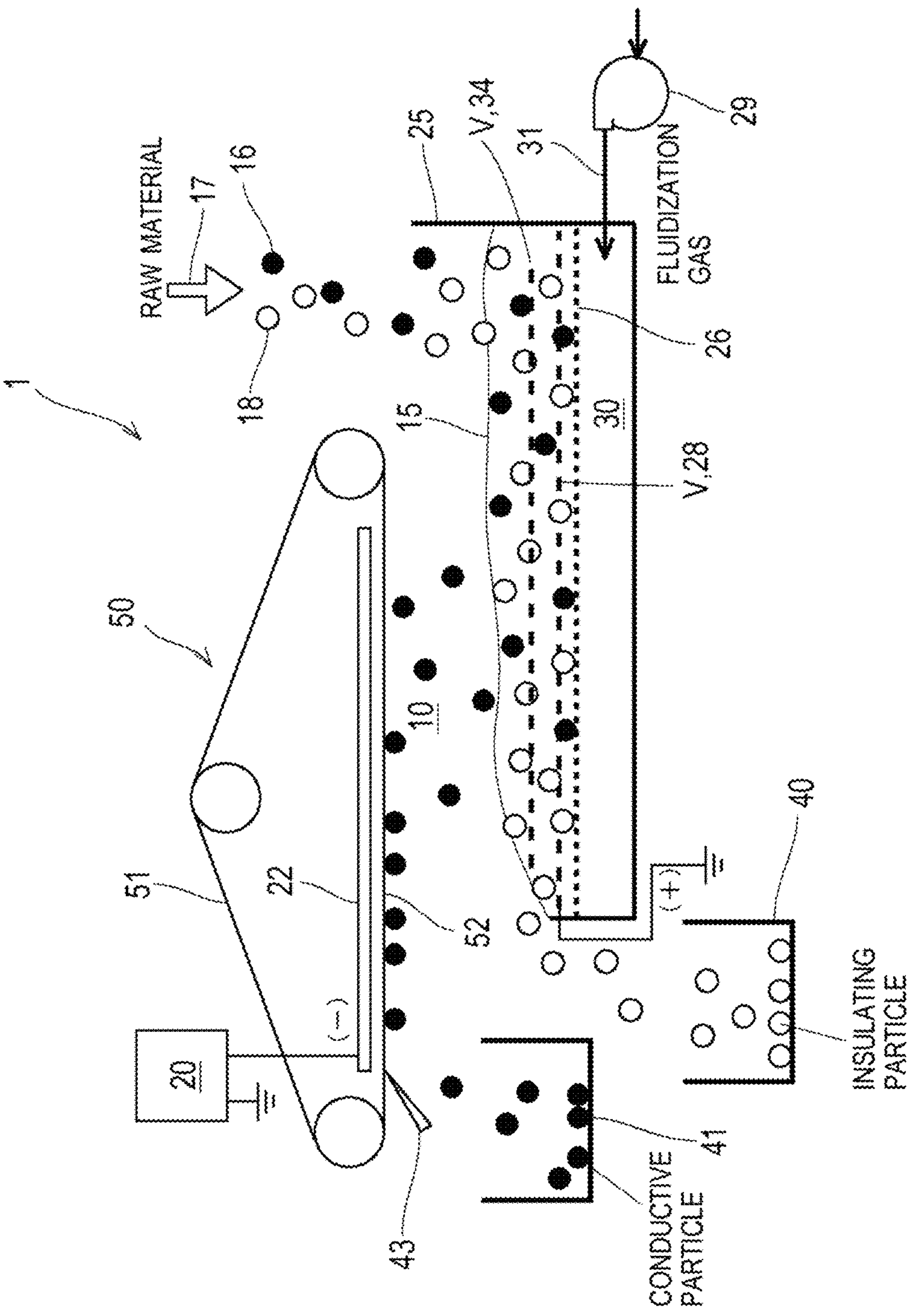
FIG. 4 is a diagram for explaining a modified example of the electrostatic separator including a raw material layer in which a lower electrode is located.

In the present embodiment, a gas dispersion plate made of metal is adopted as the gas dispersion plate 26, and the gas dispersion plate 26 also serves as the lower electrode 28. However, as shown in FIG. 4, the lower electrode 28 may be located in the raw material layer 15 and above the gas dispersion plate 26. In this case, the lower electrode 28 includes a mesh plate through which the fluidization gas 31 is allowed to pass, and a porous sheet made of resin, metal, or ceramics is adopted as the gas dispersion plate 26.

At least one vibrating body V is located in the raw material layer 15. The at least one vibrating body V is flush with the gas dispersion plate 26 or is located above the gas dispersion plate 26. In the present embodiment, the vibrating body V includes a metal mesh plate that is located in the raw material layer 15 and above the gas dispersion plate 26, and the vibrating body V also serves as the intermediate electrode 34. However, the intermediate electrode 34 may be omitted, and only the vibrating body V may be located. As shown in FIG. 4, when the lower electrode 28 is located in the raw material layer 15 and above the gas dispersion plate 26, the lower electrode 28 may be vibratable, and the vibrating body V may also serve as the lower electrode 28.

The mesh plate included in the intermediate electrode 34 (vibrating body V) has a mesh size that allows the conductive particles 16 and the insulating particles 18 in the raw material layer 15 to pass through the mesh plate. The intermediate electrode 34 is located in the raw material layer 15 and above the lower electrode 28. An interval between the lower electrode 28 and the intermediate electrode 34 may be about several millimeters to several tens of millimeters. When there are the intermediate electrodes 34, the intermediate electrodes 34 are lined up in an upper-lower direction, and the intermediate electrodes 34 and the lower electrode 28 are located substantially parallel to a bottom surface of the container 25.

When there are the intermediate electrodes 34, the mesh sizes of the intermediate electrodes 34 may be equal to each other. Or, when there are the intermediate electrodes 34, the mesh size of the intermediate electrode 34 located at an upper side may be larger. For example, when the intermediate electrodes 34 include a first intermediate electrode **34*a* and a second intermediate electrode 34*b* lined up in the upper-lower direction, the mesh size of the first intermediate electrode 34*a* located at an upper side is larger than the mesh size of the second intermediate electrode 34*b***.

The power supply 20 applies a voltage between the upper electrode 22 and the lower electrode 28 facing in the upper-lower direction. With this, one of the upper electrode 22 and the lower electrode 28 becomes a negative (−) electrode, and the other becomes a positive (+) electrode. Thus, an electric field is generated between these electrodes. In the present embodiment, a negative voltage is applied to the upper electrode 22 by the power supply 20, and the lower electrode 28 is grounded such that the upper electrode 22 becomes the negative electrode, and the lower electrode 28 becomes the positive electrode. As one example, when the interval between the upper electrode 22 and the lower electrode 28 is several tens of millimeters to several hundreds of millimeters, an absolute value of the strength of the electric field generated between the upper electrode 22 and the lower electrode 28 may be about 0.1 to 1.5 kV/mm.

Moreover, the power supply 20 applies a voltage between the upper electrode 22 and the intermediate electrode 34 such that the polarity of the intermediate electrode 34 becomes the same as the polarity of the lower electrode 28 which is the negative electrode or the positive electrode. A potential difference between the upper electrode 22 and each intermediate electrode 34 may be equal to or less than a potential difference between the upper electrode 22 and the lower electrode 28.

Figure 5:
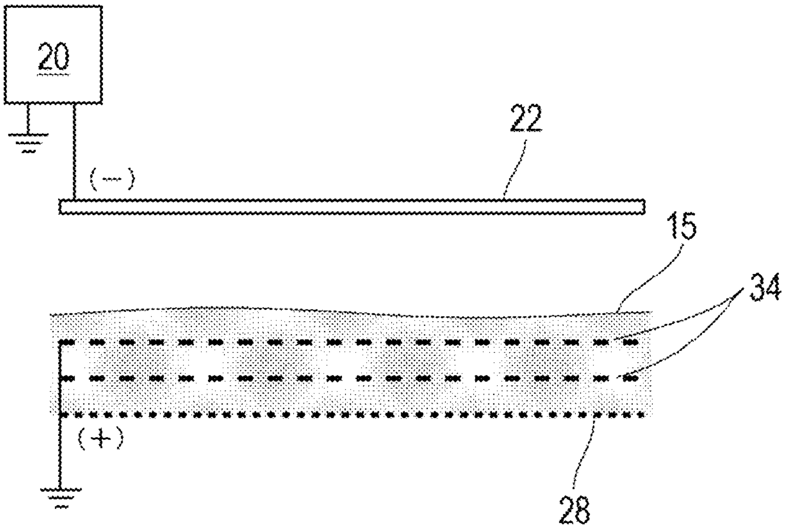
FIG. 5 is a diagram for explaining one example of a relation among potentials of electrodes.

For example, as shown in FIG. 5, the intermediate electrodes 34 and the lower electrode 28 may be grounded, and a negative voltage may be applied to the upper electrode 22. In this case, the intermediate electrodes 34 and the lower electrode 28 become the positive electrodes, and the upper electrode 22 become the negative electrode. Moreover, the potential of the lower electrode 28 and the potentials of the intermediate electrodes 34 are equal to each other. In this case, there is no potential difference between the intermediate electrodes 34, and there is no potential difference between the intermediate electrode 34 and the lower electrode 28. However, it is thought that: since the intermediate electrodes 34 are the mesh plates, the electric field is generated between the lower electrode 28 and the upper electrode 22 by the potential difference between the lower electrode 28 and the upper electrode 22 so as to pass through the meshes of the intermediate electrodes 34; and therefore, the electric field is also generated between the lower electrode 28 and the intermediate electrode 34 and between the intermediate electrodes.

Figure 6:
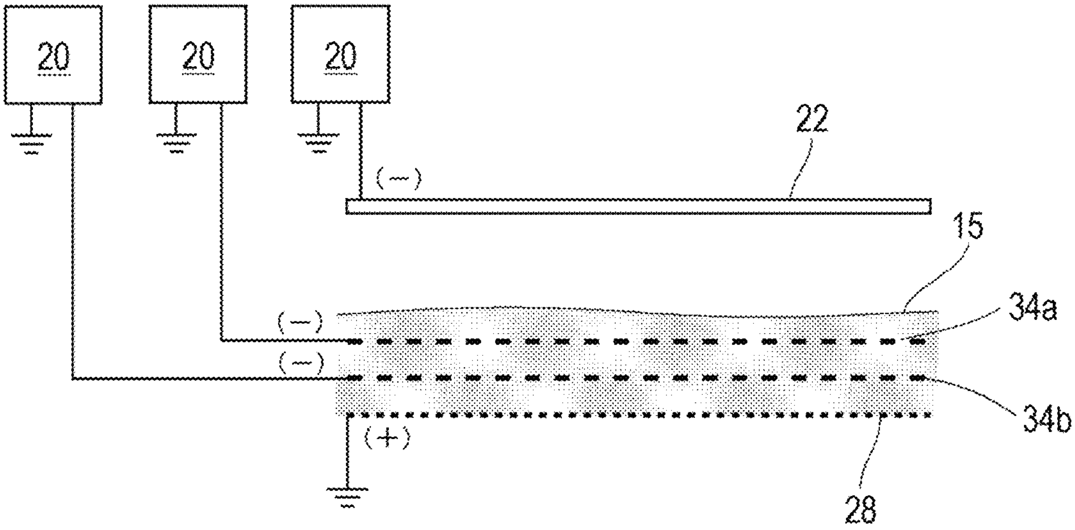
FIG. 6 is a diagram for explaining another example of a relation among potentials of electrodes.

Moreover, for example, as shown in FIG. 6, the lower electrode 28 may be grounded, and a negative voltage may be applied to the intermediate electrodes 34 and the upper electrode 22. When the intermediate electrodes 34 include the first intermediate electrode 34*a* and the second intermediate electrode 34*b* lined up in the upper-lower direction, the upper electrode 22 may be set to −20 kV, each of the first intermediate electrode 34*a* and the second intermediate electrode 34*b* may be set to −2 kV, and the lower electrode 28 may be set to 0 kV (these numerical values are merely examples). In this case, the intermediate electrodes 34 and the lower electrode 28 become the positive electrodes, and the upper electrode 22 becomes the negative electrode. Moreover, the potentials of the intermediate electrodes 34*a* and 34*b* are equal to each other. Although there is a potential difference between the intermediate electrode 34*a*, 34*b* and the lower electrode 28, this potential difference is adequately smaller than each of the potential difference between the upper electrode 22 and the intermediate electrode 34*a*, 34*b* and the potential difference between the upper electrode 22 and the lower electrode 28. In this relation, the strength of the electric field between the lower electrode 28 and the lowermost intermediate electrode 34 (in the present embodiment, the second intermediate electrode 34*b*) can be made higher than the example shown in FIG. 5.

Moreover, when the intermediate electrodes 34 include the first intermediate electrode 34*a* and the second intermediate electrode 34*b* lined up in the upper-lower direction, the upper electrode 22 may be set to −20 kV, the first intermediate electrode 34*a* may be set to −4 kV, the second intermediate electrode 34*b* may be set to −2 kV, and the lower electrode 28 may be set to 0 kV (these numerical values are merely examples). To be specific, the potential difference between the upper electrode 22 and each intermediate electrode 34 may be set such that as the intermediate electrode 34 is located away from the lower electrode 28, the potential difference between the upper electrode 22 and the intermediate electrode 34 becomes smaller (in other words, the potential difference between the lower electrode 28 and the intermediate electrode 34 becomes larger). In this case, in addition to the strength of the electric field between the lower electrode 28 and the lowermost intermediate electrode 34 (in the present embodiment, the second intermediate electrode 34*b*), the strength of the electric field between the intermediate electrodes 34 can be made higher than the example shown in FIG. 5.

Figure 7:
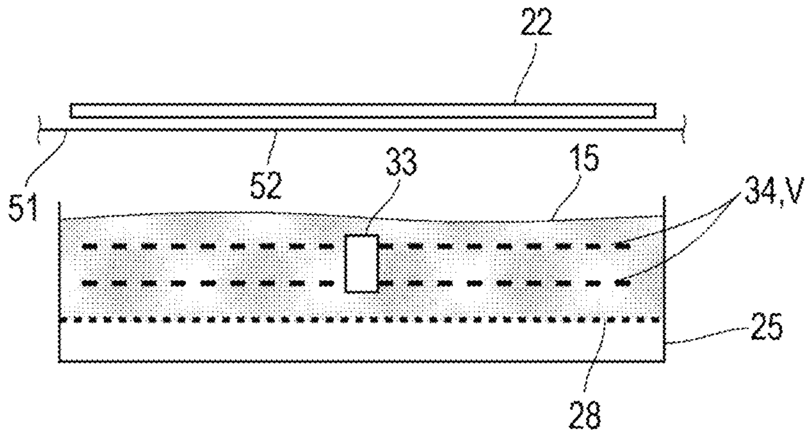
FIG. 7 is a diagram for explaining a modified example of the electrostatic separator including a vibrating body shaker.

FIG. 7 is a diagram for explaining a modified example of the electrostatic separator 1 including a vibrating body shaker 33. As shown in FIG. 7, the electrostatic separator 1 may include the vibrating body shaker 33 that vibrates at least one of the vibrating bodies V (the vibrating body V may serve as the intermediate electrode 34) independently from the container 25. In the example shown in FIG. 7, the container 25 is fixed, and the vibrating body V vibrates relative to the container 25. The vibrating body shaker 33 vibrates at least one vibrating body V in any one of the upper-lower direction and the horizontal direction or in a direction that is a combination of two or more directions. This vibration may be a reciprocating movement or a circular movement. Moreover, the electrostatic separator 1 may include the vibrating body shakers 33 that are different in frequency from each other, and vibrations of different frequencies may be superimposed such that the vibrating body V moves with large amplitude while moving with small amplitude.

Figure 8:
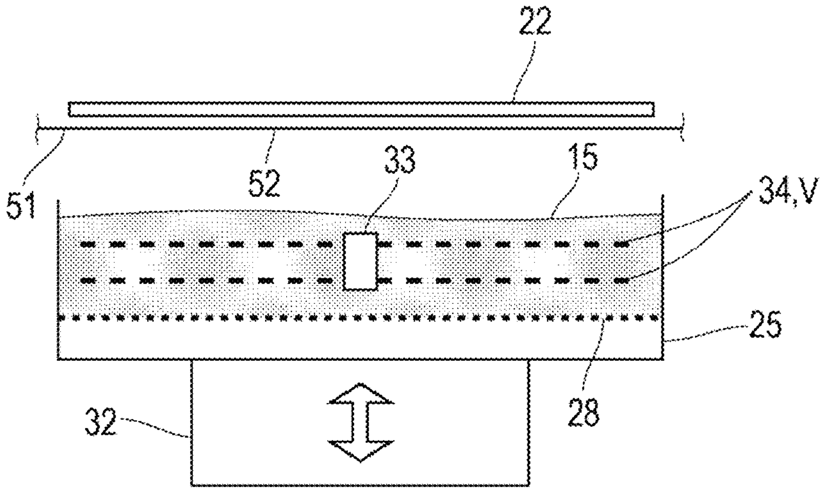
FIG. 8 is a diagram for explaining a modified example of the electrostatic separator including the vibrating body shaker and a container vibrator.

FIG. 8 is a diagram for explaining a modified example of the electrostatic separator 1 including the vibrating body shaker 33 and a container vibrator 32. As shown in FIG. 8, the electrostatic separator 1 may include the container vibrator 32 in addition to the vibrating body shaker 33. The container vibrator 32 vibrates the container 25 in any one of the upper-lower direction and the horizontal direction or in a direction that is a combination of two or more directions. This vibration may be a reciprocating movement or a circular movement. Since the electrostatic separator 1 includes the container vibrator 32 and the vibrating body shaker 33 which are independent from each other, the lower electrode 28 and at least one intermediate electrode 34 can be vibrated independently. For example, the lower electrode 28 and the intermediate electrode 34 can be vibrated with different vibration frequencies, or the lower electrode 28 and the intermediate electrode 34 can be vibrated in different directions.

Electrostatic Separation Method

Herein, an electrostatic separation method performed by using the electrostatic separator 1 configured as above will be described.

In the electrostatic separator 1 shown in FIG. 1, dielectric polarization occurs at the conveyor belt 51 that is the nonconductor (insulator, derivative) by the electric field generated between the upper electrode 22 and the lower electrode 28, and a negative or positive (corresponding to the upper electrode 22) electric charge is generated on the downward-facing conveyance surface 52, passing through the capture region 10, of the conveyor belt 51. In the present embodiment, since the upper electrode 22 is the negative electrode, the negative electric charge is generated on the conveyance surface 52.

The raw material layer 15 in the container 25 is fluidized by the fluidization gas 31, and the flow of the raw materials 17 in the upper-lower direction and the flow of the raw materials 17 in the left-right direction are generated in the raw material layer 15. To be specific, the raw material layer 15 is being stirred. The conductive particles 16 that have contacted the lower electrode 28 and/or the intermediate electrode 34 by this stirring are charged positively or negatively (corresponding to the lower electrode 28). In the present embodiment, since the lower electrode 28 is the positive electrode, the conductive particles 16 are charged positively. The insulating particles 18 (nonconductor) are not charged even when the insulating particles 18 contact the lower electrode 28.

The charged conductive particles 16 move to a surface layer portion of the raw material layer 15 by the flow of the raw materials 17, are attracted to the downward-facing conveyance surface 52 of the conveyor belt 51 by the electrostatic force, fly out of the raw material layer 15, and adhere to the downward-facing conveyance surface 52. Since the conductive particles 16 do not directly contact the upper electrode 22, the charged state of the conductive particles 16 is maintained, and the conductive particles 16 keep on being attracted to the downward-facing conveyance surface 52 of the conveyor belt 51.

The conductive particles 16 adhering to the conveyance surface 52 of the conveyor belt 51 as above are carried by the rotation of the conveyor belt 51 to an outside of the electric field. Then, the conductive particles 16 are peeled off from the conveyance surface 52 of the conveyor belt 51 by the particle separation structure 43 at the outside of the electric field and are collected in the conductive particle collecting container 41.

On the other hand, since the insulating particles 18 in the raw material layer 15 are not charged, the insulating particles 18 are not attracted to the downward-facing conveyance surface 52 of the conveyor belt 51 by static electricity and stay in the raw material layer 15. As the raw materials 17 supplied to the container 25 move from the first side toward the second side in the container 25, a ratio of the conductive particles 16 in the raw materials 17 decreases, and a ratio of the insulating particles 18 in the raw materials 17 increases. The raw materials 17 which have overflowed from the container 25 and in which the ratio of the insulating particles 18 is high are collected in the insulating particle collecting container 40 located at the second side of the container 25.

Conclusion of Present Embodiment

As described above, the electrostatic separator 1 according to the above embodiment is the electrostatic separator 1 that separates the conductive particles 16 from the raw materials 17 including the conductive particles 16 and the insulating particles 18. The electrostatic separator 1 includes: the container 25 in which the raw material layer 15 including the raw materials 17 is located; the gas dispersion plate 26 located at a bottom portion of the raw material layer 15; at least one vibrating body V located in the raw material layer 15, the at least one vibrating body V being flush with the gas dispersion plate 26 or being located above the gas dispersion plate 26; the fluidization gas supplier 29 that supplies the fluidization gas 31 that is introduced from the bottom portion of the container 25 into the raw material layer 15 and flows upward in the raw material layer 15 through the gas dispersion plate 26; the upper electrode 22 located above the raw material layer 15; the lower electrode 28 located in the raw material layer 15, the lower electrode 28 being flush with the gas dispersion plate 26 or being located above the gas dispersion plate 26; the power supply 20 that applies a voltage between the upper electrode 22 and the lower electrode 28 such that one of the upper electrode 22 and the lower electrode 28 becomes a negative electrode, the other becomes a positive electrode, and an electric field is generated between these electrodes; and the capturer 50 that captures the conductive particles 16 that have flown out of the surface of the raw material layer 15 toward the upper electrode 22.

In the above, the at least one vibrating body V may vibrate independently from the container 25.

The particle diameter of the raw material 17 included in the raw material layer 15 is smaller than the particle diameter of a flowing medium (for example, sand) of a general fluidized bed. Therefore, blow-by of the fluidization gas 31 tends to occur, and the raw material layer 15 is not satisfactorily fluidized by the occurrence of the blow-by. However, since the vibrating body V is located in the raw material layer 15 as above, the occurrence of the blow-by in the raw material layer 15 is suppressed, and therefore, a satisfactory fluidized state of the raw material layer 15 is maintained. With this, the contact between the electrode and the raw materials 17 is promoted, and the processing capacity of the electrostatic separator 1 is improved.

Especially, when the container 25 is fixed, and only the vibrating body V is vibrated by the vibrating body shaker 33, the size reduction and cost reduction of the vibrating body shaker 33 can be realized by the weight reduction and size reduction of a vibration target as compared to when the container 25 is vibrated. Therefore, the size of the container 25 is easily increased in order to improve the processing capacity of the electrostatic separator 1.

Moreover, the electrostatic separator 1 according to the above embodiment includes at least one intermediate electrode 34 located in the raw material layer 15 and above the lower electrode 28.

In the above electrostatic separator 1, the potential difference between the upper electrode 22 and the intermediate electrode 34 is equal to or less than the potential difference between the upper electrode 22 and the lower electrode 28. For example, the potential of the intermediate electrode 34 and the potential of the lower electrode 28 may be equal to each other. Or, when the electrostatic separator 1 includes the intermediate electrodes 34, a voltage is applied between the upper electrode 22 and each intermediate electrode 34 such that as the distance between the intermediate electrode 34 and the lower electrode 28 increases, the potential difference between the upper electrode 22 and the intermediate electrode 34 decreases.

According to the electrostatic separator 1 configured as above, the intermediate electrode 34 is located in the fluidized raw material layer 15, and the conductive particles 16 in the raw material layer 15 are charged by not only the contact with the lower electrode 28 but also the contact with the intermediate electrode 34. Therefore, as compared to when the intermediate electrode 34 is not included, opportunity of the charging of the conductive particles 16 increases, and the charging of the conductive particles 16 is promoted.

Moreover, in the electrostatic separator 1 configured as above, since the intermediate electrode 34 is located above the lower electrode 28, the conductive particles 16 located upward away from the lower electrode 28 in the raw material layer 15 can be charged. With this, the thickness of the raw material layer 15 can be increased, and the amount of raw materials 17 in the container 25 can be increased. Thus, the processing capacity of the electrostatic separator 1 can be improved. Furthermore, a period of time (upward movement distance) from when the conductive particles 16 are charged by the contact with the intermediate electrode 34 until these conductive particles 16 move to the surface layer portion of the raw material layer 15 is shorter than a period of time (upward movement distance) from when the conductive particles 16 are charged by the contact with the lower electrode 28 until these conductive particles 16 move to the surface layer portion of the raw material layer 15. With this, the separation efficiency of the conductive particles 16 improves, and the processing time can be shortened.

As described in the above embodiment, the intermediate electrode 34 may be vibratable, and the intermediate electrode 34 may also serve as the vibrating body V.

Moreover, as described in the above embodiment, the lower electrode 28 may be vibratable, and the lower electrode 28 may also serve as the vibrating body V.

As above, since the intermediate electrode 34 and the lower electrode 28 vibrate, the opportunity of contact between the conductive particles 16 in the raw material layer 15 and the intermediate electrode 34 and the opportunity of contact between the conductive particles 16 in the raw material layer 15 and the lower electrode 28 increase, and therefore, an effect of promoting the charging of the conductive particles 16 can be further expected.

Moreover, as described in the above embodiment, in the electrostatic separator 1, the at least one intermediate electrode 34 may include the first intermediate electrode 34*a* and the second intermediate electrode 34*b* lined up in the upper-lower direction, and the mesh size of the first intermediate electrode 34*a* may be larger than the mesh size of the second intermediate electrode 34*b*.

The intermediate electrode 34 promotes the charging of the conductive particles 16 but inhibits the upward movement of the conductive particles 16. Therefore, the mesh size of the first intermediate electrode 34*a* located at an upper side is made larger than the mesh size of the second intermediate electrode 34*b* located at the lower side. With this, as the conductive particles 16 move upward in the raw material layer 15, the degree of inhibition of the movement of the conductive particles decreases. With this, an effect of maintaining satisfactory fluidization of the raw material layer 15 is expected.

Moreover, in the electrostatic separator 1 according to the above embodiment, the capturer 50 includes the conveyor belt 51 that includes a nonconductor and rotates such that the downward-facing conveyance surface 52 of the conveyor belt 51 passes through the capture region 10 that is located above the raw material layer 15 and under the upper electrode 22.

In the electrostatic separator 1 configured as above, the conductive particles 16 are selectively separated from the raw material layer 15 and adhere to the conveyance surface 52 of the conveyor belt 51 by the electrostatic force. Therefore, the amount of insulating particles 18 adhering to the conveyance surface 52 of the conveyor belt 51 is suppressed. As a result, the insulating particles 18 are prevented from getting into particulates which are collected in the conductive particle collecting container 41 and mainly include the conductive particles 16.

Moreover, in the electrostatic separator 1 according to the above embodiment, the capturer 50 further includes the insulating particle separation promoter 53 that separates the insulating particles 18, adhering to the conveyor belt 51 or the conductive particles 16 by the intermolecular force, from the conveyor belt 51.

It may be assumed that: the conductive particles 16 and the insulating particles 18 are attracted by the intermolecular force; the insulating particles 18 fly out of the raw material layer 15 together with the conductive particles 16; and the insulating particles 18 adhere to the conveyor belt 51 (or the conductive particles 16). The insulating particles 18 adhering to the conveyor belt 51 as above separate from the conveyor belt 51 by the action of the insulating particle separation promoter 53. Then, the insulating particles 18 return to the raw material layer 15 or are collected in the insulating particle collecting container 40. Thus, the amount of insulating particles 18 mixed with the conductive particles 16 collected in the conductive particle collecting container 41 can be reduced. As a result, the purity of the conductive particles 16 collected in the conductive particle collecting container 41 can be increased.

Moreover, in the electrostatic separator 1 according to the above embodiment, the capturer 50 further includes the particle separation structure 43 that destaticizes the conductive particles 16 adhering to the conveyor belt 51 by the electrostatic force to separate the conductive particles 16 from the conveyor belt 51.

With this, the conductive particles 16 adhering to the conveyor belt 51 can be easily separated from the conveyor belt 51. Moreover, by eliminating the charging of the conductive particles 16, a destaticizing treatment after the collection is unnecessary.

Moreover, in the electrostatic separator 1 according to the above embodiment, the movement direction D1 of the conveyance surface 52 in the capture region 10 by the rotation of the conveyor belt 51 and the flow direction D2 of the raw materials 17 in the container 25 are orthogonal to each other in a plan view.

Similarly, in the electrostatic separation method according to the present embodiment, the movement direction D1 of the conveyance surface 52 in the capture region 10 by the rotation of the conveyor belt 51 and the flow direction D2 of the raw materials 17 in the raw material layer 15 are orthogonal to each other in a plan view.

As above, when the movement direction D1 of the conveyance surface 52 in the capture region 10 and the flow direction D2 of the raw materials 17 are orthogonal to each other, the conductive particles 16 can adhere to the conveyance surface 52 more efficiently than when the movement direction D1 and the flow direction D2 are parallel to each other.

The foregoing has described the preferred embodiment (and the preferred modified example) of the present disclosure. Modifications of specific structures and/or functional details of the above embodiment may be included in the present disclosure as long as they are within the scope of the present disclosure. The above configuration may be modified as below, for example.

For example, in the above embodiment, the lower electrode 28 is the positive electrode, and the upper electrode 22 is the negative electrode. However, in accordance with the characteristics of the conductive particles 16, the lower electrode 28 may be the negative electrode, and the upper electrode 22 may be the positive electrode.

For example, in the above embodiment, a conveyor capturer that utilizes electrostatic force is adopted as the capturer 50. However, the capturer 50 is not limited to this. For example, the capturer 50 may convey the conductive particles 16, flying out of the surface layer of the raw material layer 15, by gas flow and collect the conductive particles 16.

The invention claimed is:

1. An electrostatic separator that separates conductive particles from raw materials including the conductive particles and insulating particles, the electrostatic separator comprising:

- a container in which a raw material layer including the raw materials is located;
- a gas dispersion plate located at a bottom portion of the raw material layer;
- at least one vibrating body located in the raw material layer, the at least one vibrating body being flush with the gas dispersion plate or being located above the gas dispersion plate;
- a fluidization gas supplier that supplies a fluidization gas that is introduced from a bottom portion of the container into the raw material layer and flows upward in the raw material layer through the gas dispersion plate;
- an upper electrode located above the raw material layer;
- a lower electrode located in the raw material layer, the lower electrode being flush with the gas dispersion plate or being located above the gas dispersion plate;
- a power supply that applies a voltage between the upper electrode and the lower electrode such that one of the upper electrode and the lower electrode becomes a negative electrode, the other becomes a positive electrode, and an electric field is generated between these electrodes;
- a capturer that captures the conductive particles that have flown out of a surface of the raw material layer toward the upper electrode; and
- at least one intermediate electrode located in the raw material layer and above the lower electrode, wherein
- a potential difference between the upper electrode and the intermediate electrode is equal to or less than a potential difference between the upper electrode and the lower electrode.

2. The electrostatic separator according to claim 1, wherein the at least one vibrating body vibrates independently from the container.

3. The electrostatic separator according to claim 1, wherein:

the lower electrode is vibratable; and the lower electrode also serves as the vibrating body.

4. The electrostatic separator according to claim 1, wherein:

the intermediate electrode is vibratable; and the intermediate electrode also serves as the vibrating body.

5. The electrostatic separator according to claim 1, wherein:

the at least one intermediate electrode comprises intermediate electrodes lined up in an upper-lower direction; and a voltage is applied between the upper electrode and each intermediate electrode such that as the intermediate electrode is located away from the lower electrode, a potential difference between the upper electrode and the intermediate electrode decreases.

6. The electrostatic separator according to claim 1, wherein:

the at least one intermediate electrode comprises a first intermediate electrode and a second intermediate electrode lined up in an upper-lower direction; and a mesh size of the first intermediate electrode is larger than a mesh size of the second intermediate electrode.

7. The electrostatic separator according to claim 1, wherein the capturer includes a conveyor belt that rotates such that a downward-facing conveyance surface of the conveyor belt passes through a capture region that is located above the raw material layer and under the upper electrode.

8. The electrostatic separator according to claim 7, wherein the capturer further includes an insulating particle separation promoter that separates the insulating particles, adhering to the conveyor belt or the conductive particles by intermolecular force, from the conveyor belt.

9. The electrostatic separator according to claim 7, wherein the capturer further includes a particle separation structure that destaticizes the conductive particles adhering to the conveyor belt by electrostatic force to separate the conductive particles from the conveyor belt.

10. The electrostatic separator according to claim 7, wherein a movement direction of the conveyance surface in the capture region by the rotation of the conveyor belt and a flow direction of the raw materials in the container are orthogonal to each other in a plan view.

* * * * *